(12) United States Patent
Lin (10) Patent No.: US 10,363,695 B2
(45) Date of Patent: Jul. 30, 2019

(54) MOLD MOVEMENT CONTROL MECHANISM AND MOLD HAVING THE SAME

(71) Applicant: SHEN YUAN PRECISION MOLD TECHNOLOGY CO., LTD., Nantou County (TW)

(72) Inventor: Chih Ming Lin, Taichung (TW)

(73) Assignee: SHEN YUAN PRECISION MOLD TECHNOLOGY CO., LTD., Nantou (TW)

( * ) Notice: Subject to any disclaimer, the term of this patent is extended or adjusted under 35 U.S.C. 154(b) by 270 days.

(21) Appl. No.: 15/410,090

(22) Filed: Jan. 19, 2017

(65) Prior Publication Data
US 2018/0200935 A1    Jul. 19, 2018

(51) Int. Cl.
  *B29C 45/04* (2006.01)
  *B29C 45/26* (2006.01)
  *B29C 45/17* (2006.01)

(52) U.S. Cl.
  CPC ...... *B29C 45/1761* (2013.01); *B29C 45/1756* (2013.01); *B29C 2945/76568* (2013.01)

(58) Field of Classification Search
  CPC ............ B29C 45/1761; B29C 45/1756; B29C 2045/2604; B29C 2945/76568; B29C 45/641; B29C 33/20
  See application file for complete search history.

(56) References Cited

U.S. PATENT DOCUMENTS

| | | | | |
|---|---|---|---|---|
| 4,403,810 A * | 9/1983 | Bieneck | ................ | B29C 33/202 425/589 |
| 4,408,981 A * | 10/1983 | Brown | ................ | B29C 45/1761 425/338 |
| 8,727,764 B2 * | 5/2014 | Ossanai | ................ | B29C 33/202 425/451.9 |
| 9,186,821 B2 * | 11/2015 | Bokich | .................... | B29C 33/20 |
| 2012/0100239 A1 * | 4/2012 | Li | ........................... | B29C 33/20 425/161 |
| 2018/0326637 A1 * | 11/2018 | Nishimura | ............ | B29C 45/641 |

FOREIGN PATENT DOCUMENTS

WO    WO-2006041148 A1 *    4/2006    ............ B29C 49/02

* cited by examiner

*Primary Examiner* — Anthony Calandra
*Assistant Examiner* — Jerzi H Moreno Hernandez (57) ABSTRACT

The present invention provides a mold movement control mechanism which is suitable for being assembled in mold to drive the plates of the mold to move. The mold movement control mechanism has a rotatable engaging member and two moving members. In one predetermined travel section, the engaging member is kept unable to rotate. The moving members are then engaged and moved together by the engaging member. After the moving members and the engaging member are moved across the predetermined travel section, the engaging member become rotatable, and the moving members are moved independently. Thus, the mold movement control mechanism can control the positions and travel paths of the moving members without spring. Manufacturing tolerance and maintenance cost could be both lowered.

16 Claims, 8 Drawing Sheets

MOLD MOVEMENT CONTROL MECHANISM AND MOLD HAVING THE SAME

BACKGROUND OF THE INVENTION

Field of the Invention

The present invention relates to a controlling mechanism, utilized for controlling movement and travel of plates of a mold precisely.

Description of the Prior Art

The mold controlling mechanisms employed, such as the mechanism used in injection molding machine, could guide plates of a mold in a restricted path by using bars or grooves or channels. Springs are also used for pushing the plates to move in a predetermined sequence and/or to predetermined locations.

In the previous mentioned controlling mechanism, the forces provided by the springs should be limited to predetermined particular values in order to move the plates of the mold in a designed order. However, the manufacturing parameters, such as injection pressure or molding pressure, may be subjected to change. The forces provided by the springs need to be taken into consideration along with the whole module when changing the working parameters, which would lead to design difficulties of the mold.

Besides, abrasion, corrosion, or fatigue may occur to the springs after a period of working. The forces provided by the springs would deviate from the designed given values. Precision of position of the mold is then lowered. Maintenance and recorrection of the mold and the springs have to be held frequently. Cost of manufacturing is unavoidably raised.

SUMMARY OF THE INVENTION

One object of the present invention is to provide a controlling mechanism for mold which is able to control the position and the travel of the mold precisely even without springs.

To achieve the above and other objects, one embodiment of the present invention provides a mold movement control mechanism which is suitable for being assembled in a mold to drive plates of the mold to move. The mold movement control mechanism has a rotatable engaging member and two moving members. In one predetermined travel section, the engaging member is restricted from rotation. The moving members are then engaged and moved along with the engaging member.

After the moving members and the engaging member are moved across the predetermined travel section, the engaging member become rotatable while the moving members are not moved simultaneously.

To achieve the above and other objects, another embodiment of the present invention provides a mold which includes the mold movement control mechanism mentioned above and a mold module. The mold module includes a plurality of plates which are combined with the moving members respectively.

Accordingly, the mold movement control mechanism can help control position and operation travel of the plates of the mold. Spring is thus unnecessary. Cost of design and maintenance can be lowered, and product precision can be improved.

DETAILED DESCRIPTION OF THE PREFERRED EMBODIMENTS

Figure 1:
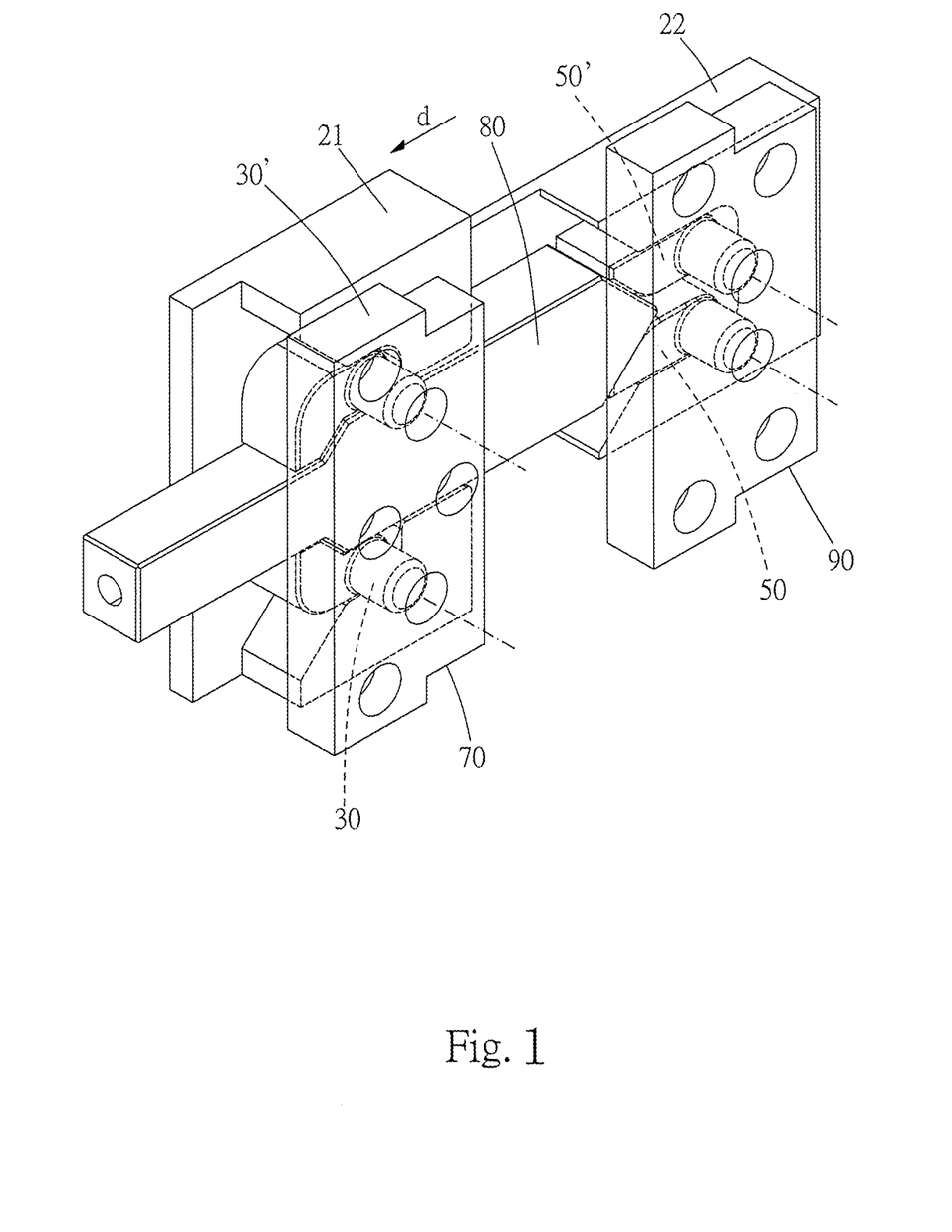
FIG. 1 is a perspective view showing a mold movement control mechanism of a first embodiment of the present invention.
Figure 2:
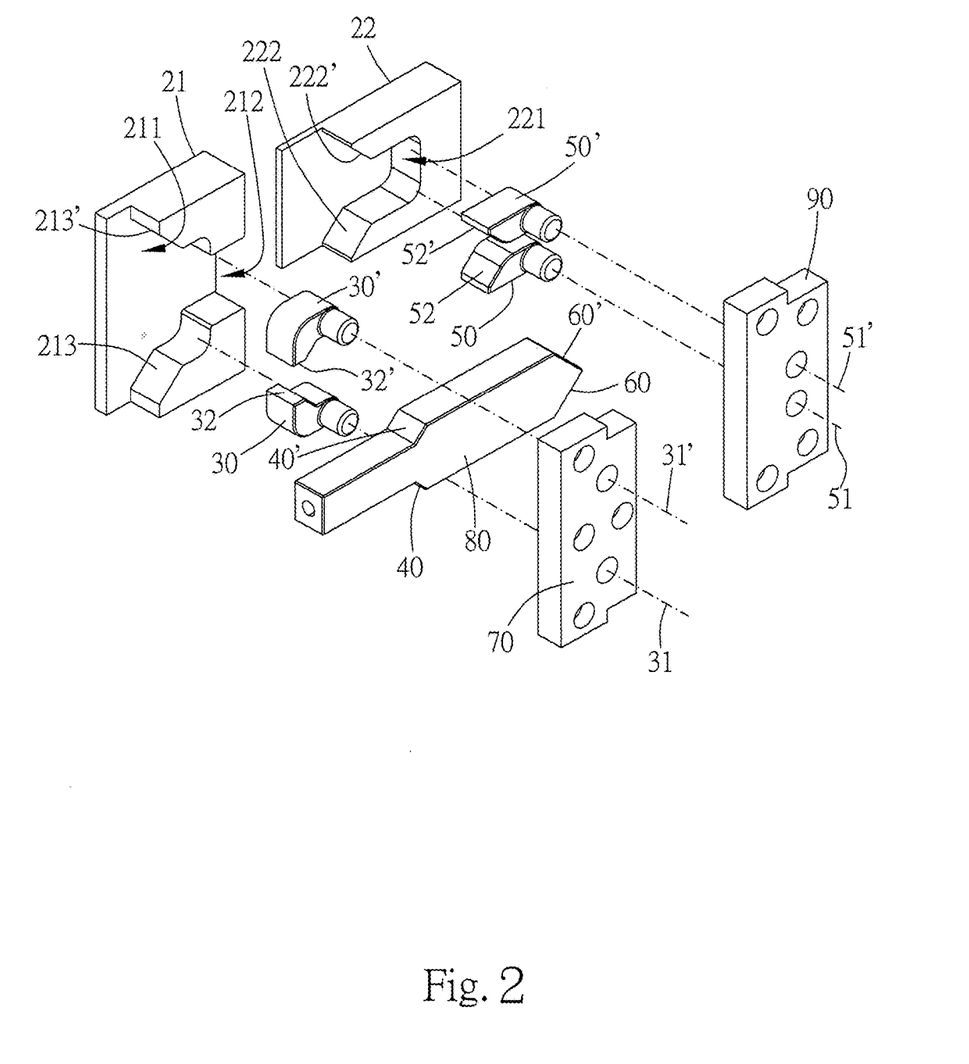
FIG. 2 is an exploded view showing a mold movement control mechanism of a first embodiment of the present invention.
Figure 3:
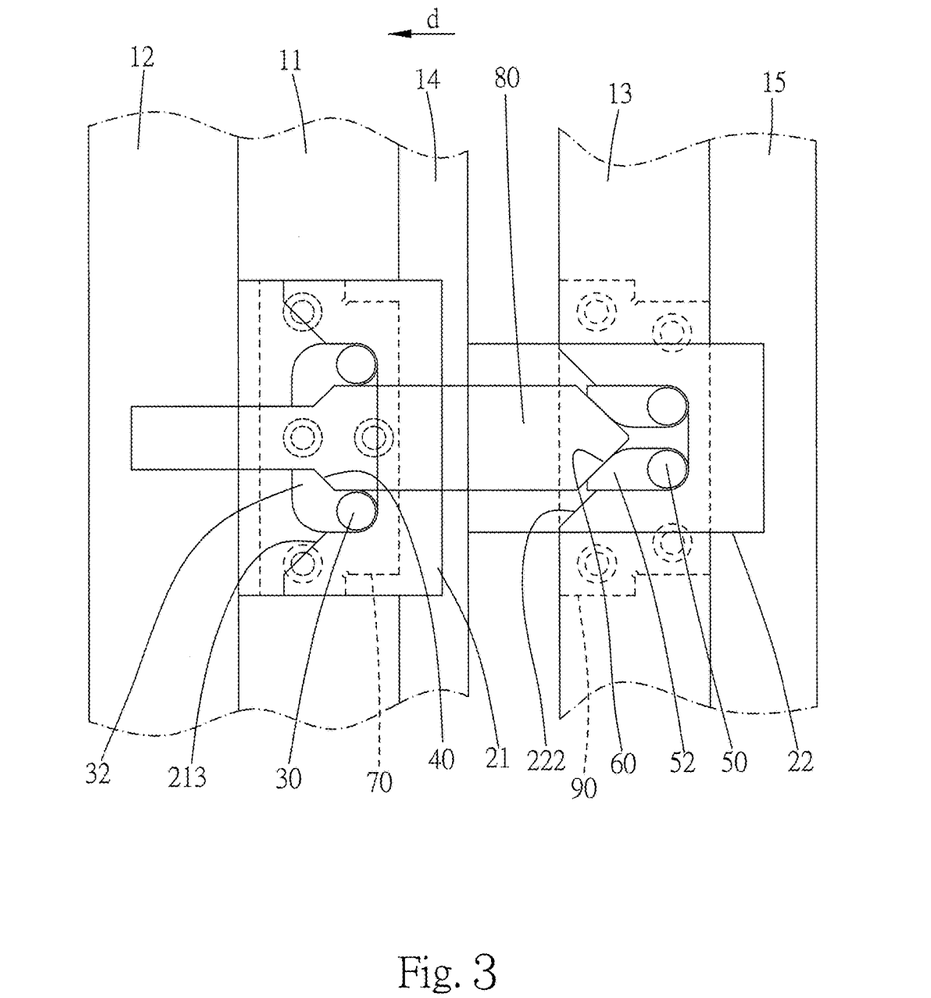
FIG. 3 is a cross sectional view showing a mold of a first embodiment of the present invention.

Please refer to FIG. 1 to FIG. 3 for an embodiment of the present invention. The present embodiment provides a mold movement control mechanism which is usually combined in a mold with a mold module. As shown in FIG. 3, the mold module includes a first plate 11, a second plate 12, and a third plate 13. The plates are components of the mold module which is utilized for molding works or products in manufacturing processes, such as injection molding process. The plates may be formed with cavities which contacts and receives the product directly in manufacturing processes. In other cases, the plates may be designed for carrying and controlling cores which are formed with cavities. Generally, the plates are made with flat appearance. However, the dimensions and the shape of the plates are not limited, adjustable for fitting with products and manufacturing machines. To remove or demould the product, the mold module can opened, closed, or moved by moving the mold module or the plates 11, 12, 13 respectively along a travel direction d. In other possible embodiments of the present invention, the mold module may include only two plates 11, 12 or more than three plates to fulfill the needs of processing.

Please refer to FIG. 1 and FIG. 2. The mold movement control mechanism includes a base module, two engaging members 30, 30', two abutting portions 40, 40', two coupling members 50, 50', two pushing portions 60, 60', a first moving member 70, a second moving member 80, and a third moving member 90. The engaging members 30, 30', the abutting portions 40, 40', the coupling members 50, 50', the pushing portions 60, 60' are symmetrically performed, disposed, and organized by the second moving member 80. The structure described below is mainly based on the lower half portion of the mold movement control mechanism. The other half portion of the mold movement control mechanism can be found just above the second moving member 80.

The base module includes a first fixation member 21 and a second fixation member 22. The first fixation member 21 and the second fixation member 22 are provided for the components of the mold movement control mechanism to be assembled thereon, and further be assembled in molding machine or other manufacturing machines. In the present embodiment, the first fixation member 21 and the second fixation member 22 are individually assembled in machine, assembled on the fixation plates 14, 15 of a manufacturing machine respectively, as shown in FIG. 3. However, it is also possible to assemble the fixation plates 14, 15 on one single component or to provide the fixation plates 14, 15 as a combined integrally formed component. The first fixation member 21 has a first sliding groove 211 and a restriction groove 212. The second fixation member 22 has a second sliding groove 221. The first sliding groove 211 includes a first front sub-groove and a first rear sub-groove. The first front sub-groove connects and communicates the first rear sub-groove to the restriction groove 212. The first fixation member 21 has two tilt surfaces 213, 213' which are symmetrically located at two sides of the first rear sub-groove. A width of the first rear sub-groove is then gradually enlarged toward the travel direction d from the first front sub-groove. The second sliding groove 221 includes a second front sub-groove and a second rear sub-groove. The second sliding groove 221 has two tilt surfaces 222, 222' which are symmetrically located at two sides of the second rear sub-groove. A width of the second rear sub-groove is then gradually enlarged toward the travel direction d from the second front sub-groove. The first front sub-groove and the second front sub-groove are respectively defined by two parallel walls located symmetrically at two sides of the corresponding sub-grooves.

Figure 4:
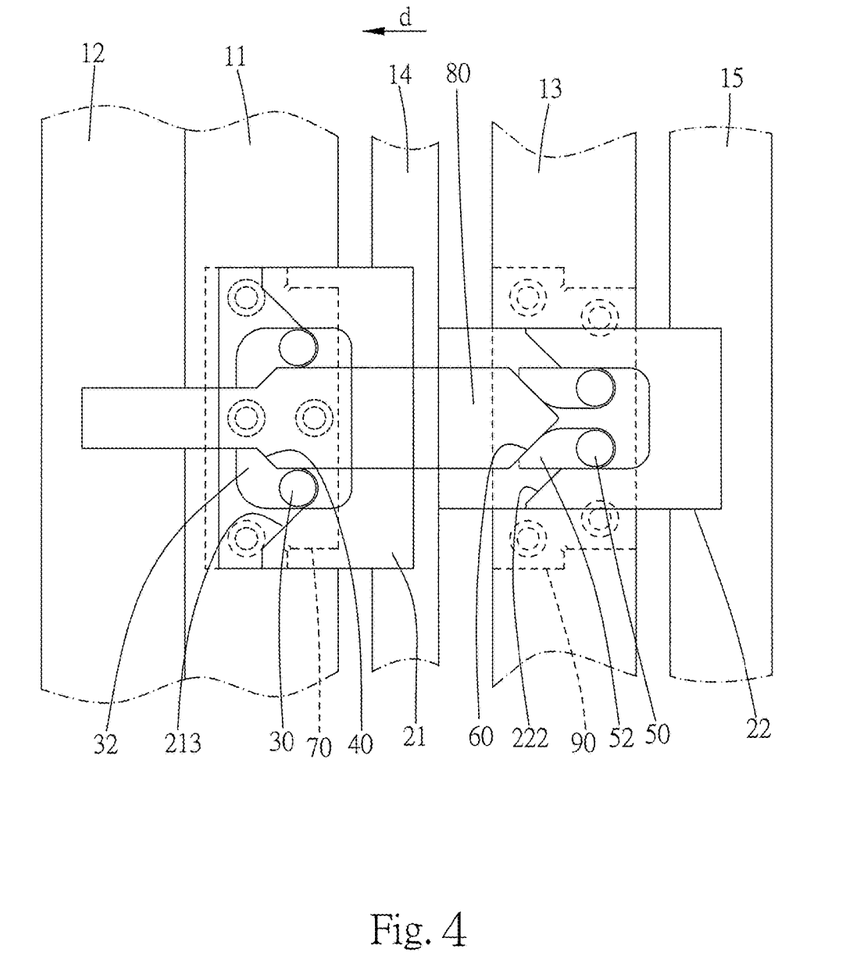
FIGS. 4-7 are serial drawings illustrating travels of parts of a mold of a first embodiment of the present invention.
Figure 5:
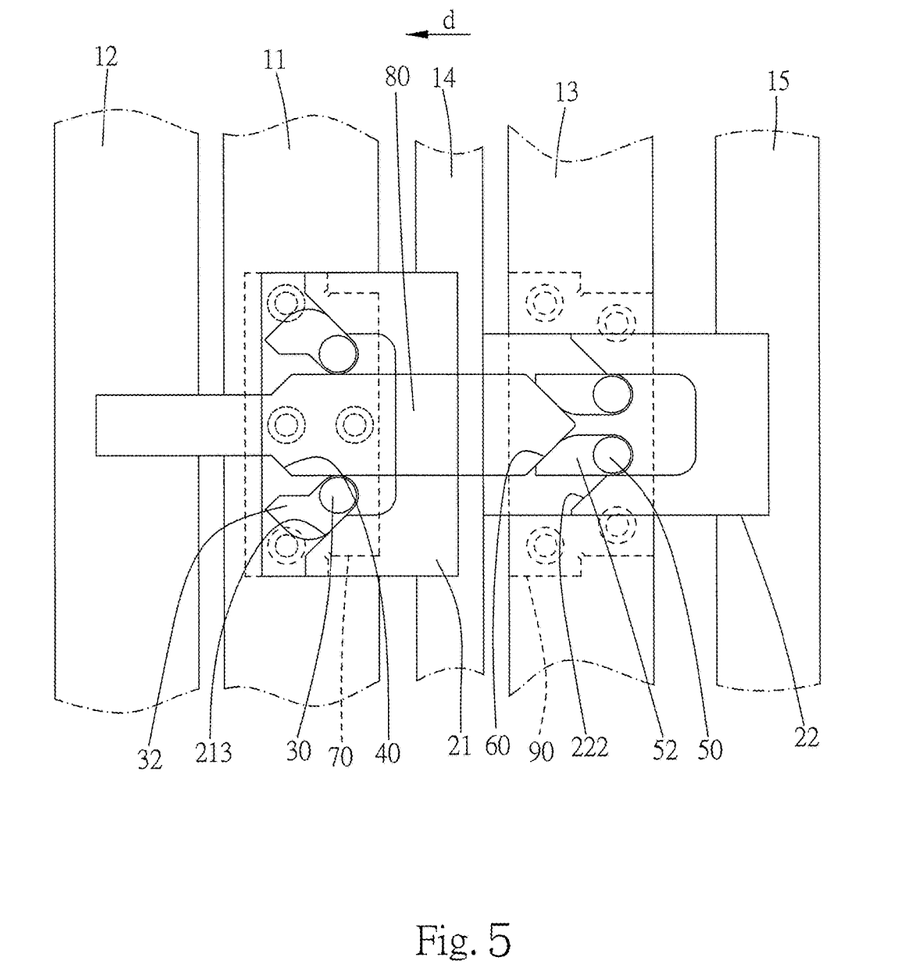

The engaging member 30 is rotatably disposed on the first moving member 70. The engaging member 30 is rotatable about an engaging axis 31 which moves together with the first moving member 70. The engaging member 30 is received in the first sliding groove 211. Restricted by the first fixation member 21 and the first sliding groove 211, the engaging member 30 is movable along the travel direction d, bringing the first moving member 70 to move along the travel direction d together. The engaging member 30 has a protrusion 32 which extends radially away from the engaging axis 31. Please refer to FIG. 3, the engaging members 30, 30' are restricted by the first fixation member 21 when the engaging members 30, 30' are located in the first front sub-groove. The engaging members 30, 30' are kept close to each other and kept in an engagement position. After the engaging members 30, 30' are moved to the first rear sub-groove along the travel direction d, as shown in FIG. 4 and FIG. 5, the engaging members 30, 30' are rotatable respectively about the engaging axes 31, 31'. Therefore, the engaging members 30, 30' can be rotated toward a release position away from each other.

The abutting portion 40 is disposed on the second moving member 80. More particularly, the abutting portions 40, 40' are two tilt surfaces formed symmetrically on two sides of the second moving member 80. The abutting portions 40, 40' are gradually closing to each other toward the travel direction d. The abutting portion 40 abuts against the protrusion 32 of the engaging member 30 when the engaging member 30 is located at the engagement position, so that the abutting portion 40 can push the engaging member 30 to move along the travel direction. The abutting portion 40 and the engaging member 30 have a contacting surface tilted to the travel direction d. More particularly, the travel direction d and the contacting surface of the abutting portion 40 and the engaging member 30 have an angle larger than 0 degree and smaller than 90 degrees. Thus, the engaging member 30 would receive a torque bringing the engaging member 30 a tendency to rotate from the engagement position to the release position when the engaging member and the abutting portion are abutting against each other. In other words, without restrictions, the engaging member 30 would rotate toward the release position when abutting against the abutting portion 40.

Figure 6:
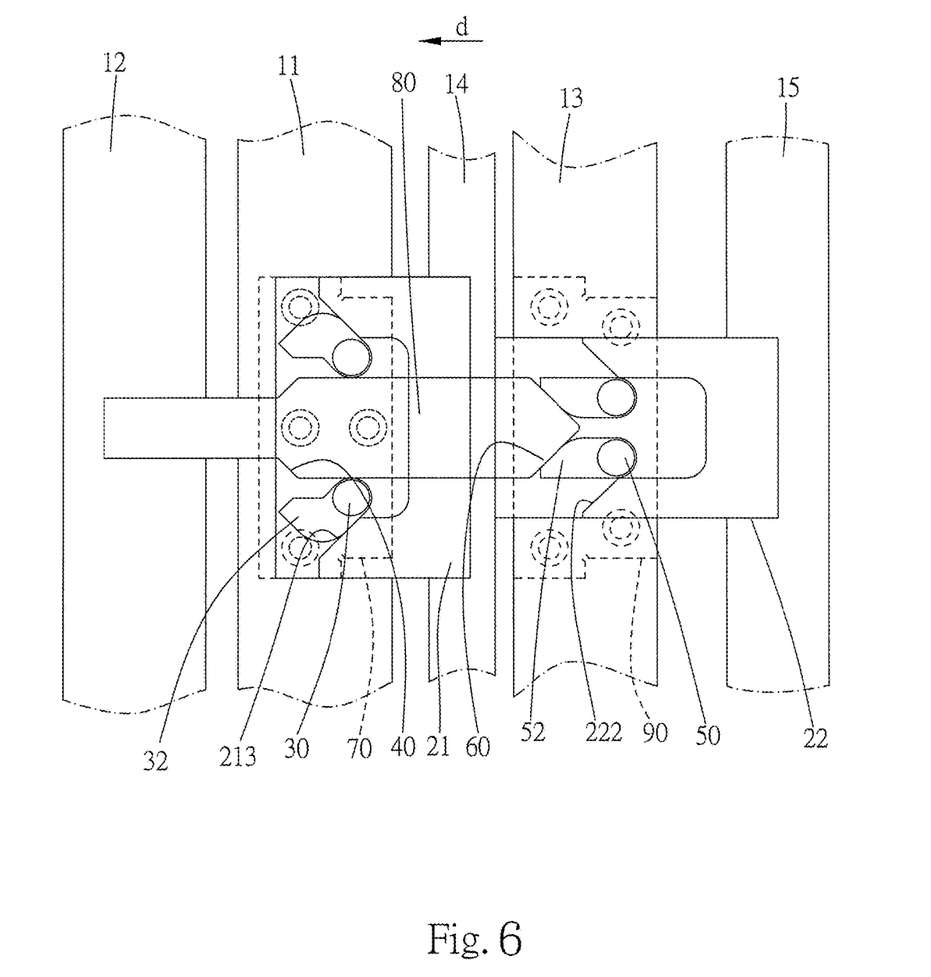
Figure 7:
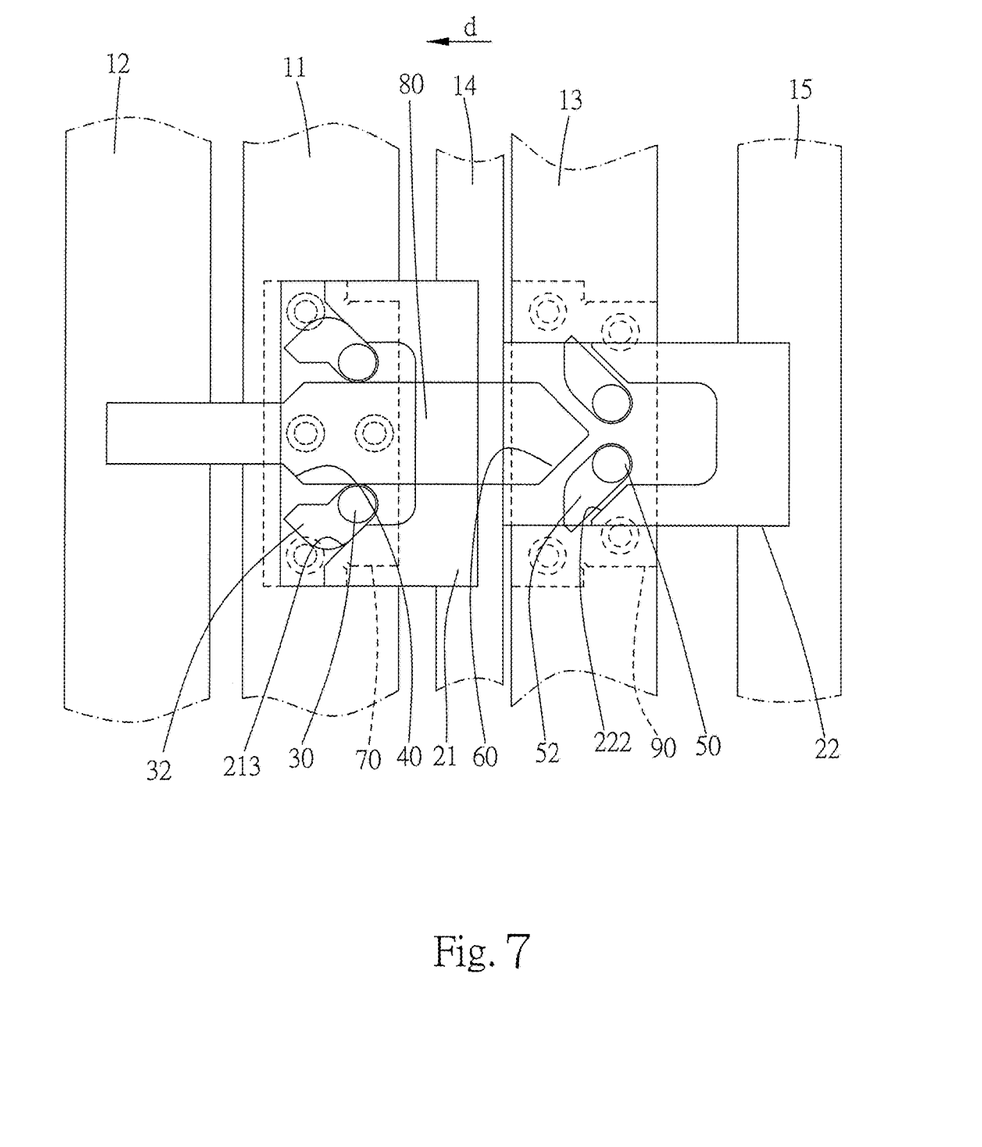

The coupling member 50 is rotatably disposed on the third moving member 90. The coupling member 50 is rotatable about a coupling axis 51 which moves together with the third moving member 90. The coupling member 50 is received in the second sliding groove 221. Restricted by the second fixation member 22 and the second sliding groove 221, the coupling member 50 is movable along the travel direction d, bringing the third moving member 90 to move along the travel direction d together. The coupling member 50 has a top portion 52 which extends radially away from the coupling axis 51. As shown in FIG. 3, the coupling members 50, 50' are restricted by the second fixation member 22 when the coupling members 50, 50' are located in the second front sub-groove. The coupling members 50, 50' are kept close to each other and kept in a closing position. After the coupling members 50, 50' are moved to the second rear sub-groove along the travel direction d, as shown in FIG. 6 and FIG. 7, the coupling members 50, 50' are rotatable respectively about the coupling axes 51, 51'. Therefore, the coupling members 50, 50' can be rotated toward an opening position away from each other.

The pushing portion 60 is disposed on the second moving member 80. More particularly, the pushing portions 60, 60' are two tilt surfaces formed symmetrically on two sides of the end of the second moving member 80. The pushing portions 60, 60' are gradually leaving away from each other toward the travel direction d. The pushing portion 60 abuts against the top portion 52 of the coupling member 50 when the coupling member 50 is located at the closing position. Thus, the pushing portion 60 can be pushed by the coupling member 50 to move along the travel direction, and the second moving member 80 is moved, also. The pushing portion 60 and the coupling member 50 have a contacting surface tilted to the travel direction d. Thus, the coupling member 50 would receive a torque bringing the coupling member 50 a tendency to rotate from the closing position to the opening position when the coupling member and the pushing portion are abutting against each other. That is to say, without restrictions, the coupling member 50 would rotate toward the opening position when abutting against the pushing portion 60.

The first moving member 70 is moved together with the engaging member 30 and is movable along the travel direction d with respect to the first fixation member 21. The first moving member 70 is provided to be combined with the first plate 11. The combination of the moving member and the plate here means to make the components mechanically united. The method of combining the components includes but not limited to using screws, pins, or rivets to assembling the components. In addition, combining and providing the components on one single integrally formed part is also possible. In the present embodiment, the first moving member 70 has several fixing holes for screws to be fixed on the first plate 11.

The second moving member 80 is movably disposed in the restriction groove 212. Side surfaces of the second moving member 80 fit and contact the restriction groove 212, so that the second moving member 80 is movable along the travel direction d with respect to the first fixation member 21. One end of the second moving member 80 is formed with the pushing portions 60, 60', and the other end is provided to be combined with the second plate 12.

The third moving member 90 is moved together with the coupling member 50 and is movable along the travel direction d with respect to the second fixation member 22. The third moving member 90 is provided to be combined with the third plate 13. Similarly with the first moving member 70, in the present embodiment, the third moving member 90 and the third plate 13 are combined together by but not limited in using screws.

Please refer to FIG. 3. The mold movement control mechanism of the present embodiment is provided for the mold, being used for controlling motions of the first plate 11, the second plate 12, and the third plate 13 of the mold module. Thus, locations and moving travels of the plates are under control. The first plate 11 is combined with the first moving member 70, the second plate 12 is combined with the second moving member 80, and the third plate 13 is combined with the third moving member 90. Therefore, the locations and moving travels of the moving members could represent and be corresponded to those of the plates.

Initially, before starting to move the plates 11, 12, 13, as shown in FIG. 3, the third moving member 90 is located at a third initial position, the coupling member 50 is located at a first coupling position, the pushing portion 60 abuts against the top portion 52 of the coupling member 50, the second moving member 80 is located at a second initial position, the engaging member 30 is located at a first engaging position, the abutting portion 40 abuts against the protrusion 32 of the engaging member 30, and the first moving member 70 is located at a first initial position.

For moving the plates 11, 12, 13, the third plate 13 or the third moving member 90 may be pushed by ejector, guide post, plunger, piston, or cylinder operated with the manufacturing machine. The third moving member 90 is then moved along the travel direction d. Please refer to FIG. 3 and FIG. 4, the coupling member 50, the pushing portion 60, the second moving member 80, the abutting portion 40, the engaging member 30, and the first moving member 70 are serially moved along the travel direction d. The coupling member 50 and the engaging member 30 are restricted respectively by the second fixation member 22 and the first fixation member 21, being unable to rotate. Thus, the coupling member 50 and the engaging member 30 are moved simply along the travel direction d.

As the first moving member 70 moves along the travel direction via a first moving travel with a predetermined length to a first moving position, as shown in FIG. 3 and FIG. 4, the engaging member 30 is moved to a moved engaging position via an engaging member travel with the same predetermined length. The second moving member 80 is moved to a second moving position via a second moving travel with the same predetermined length, bringing the abutting portion 40 to move together. The engaging member 30 is moved from the first front sub-groove to the first rear sub-groove. The engaging member 30 is then able to rotate toward the release position from the engagement position, as respectively shown in FIG. 5 and FIG. 4. The engaging member 30 and the abutting portion 40 are relieved from abutment, and the engaging member 30 may rotate to contact the tilt surface 213 of the first fixation member 21. When the engaging member 30 is abutted by the abutting portion 40, a torque is exerted on the engaging member 30, bringing the engaging member 30 to rotate toward the release position from the engagement position. After the engaging member 30 and the abutting portion 40 are relieved from abutment, the engaging member 30 would not be moved along the travel direction d by the abutting portion 40. It is noted that FIG. 5 is presented for illustrating the possible end position of the engaging member 30 only. The rotation and actual position of the engaging member 30 is determined by the torque caused by the abutment and interference of the engaging member 30 and the abutting portion 40. After the engaging member 30 is moved to the moved engaging position, the engaging member 30 is rotated gradually toward the release position following further movement of the abutting portion 40 and the second moving member 80. In the end, the engaging member 30 may not actually be rotated to the release position.

Please refer to FIG. 5 and FIG. 6. After the engaging member 30 is rotated toward the release position, further movement of the abutting portion 40 and the second moving member 80 would no longer be able to push or bring the engaging member 30 to move together along the travel direction d. The engaging member 30 and the first moving member 70 would stay without further moving when the second moving member 80 is moved later. The second moving member 80 may be pushed by the force provided from the third moving member 90, moved along the travel direction from the second moving position to a second end position via a second forward travel, as shown in FIG. 6. Accordingly, the second moving member 80 can be moved along the travel direction d in the second moving travel and the second forward travel. When the second moving member 80 is moved in the second moving travel, the first moving member 70 is moved simultaneously. After the second moving member 80 is moved to the dividing point of the second moving travel and the second forward travel, the first moving member 70 is no longer moved together with the second moving member 80.

Please refer to FIG. 3, FIG. 6, and FIG. 7. When the second moving member 80 is moved from the second initial position to the second end position via the second moving travel and the second forward travel, as shown in FIG. 6, the pushing portion 60 is moved together. The coupling member 50 is moved to a moved coupling position via a coupling member travel which has a predetermined length equal to the total length of the second moving travel and second forward travel. The third moving member 90 is moved to a third moving position via a third moving travel which has a same predetermined length as the coupling member travel has. The coupling member 50 is moved from the second front sub-groove to second rear sub-groove. The coupling member 50 is then able to rotate toward the opening position from the closing position, as respectively shown in FIG. 7 and FIG. 6. The coupling member 50 and the pushing portion 60 are relieved from abutment, and the coupling member 50 may rotate to contact the tilt surface 222 of the second fixation member 22. When the coupling member 50 abuts against the pushing portion 60, a torque is exerted on the coupling member 50, bringing the coupling member 50 to rotate toward the opening position from the closing position. After the coupling member 50 and the pushing portion 60 are relieved from abutment, the pushing portion 60 would not be moved along the travel direction d by the coupling member 50. Similarly with the engaging member 30 shown in FIG. 5, FIG. 7 is presented for illustrating the possible end position of the coupling member 50 only. The torque exerted on the coupling member 50 comes from the abutment and interference of the coupling member 50 and the pushing portion 60. After the coupling member 50 is moved to the moved coupling position, the coupling member 50 is rotated gradually toward the opening position following further movement of the coupling member 50 and the third moving member 90. In the end, the coupling member 50 may not actually be rotated to the opening position.

Please refer to FIG. 7. After the coupling member 50 is rotated toward the opening position, further movement of the coupling member 50 and the third moving member 90 would no longer be able to push or bring the pushing portion 60 to move together along the travel direction d. The third moving member 90 may be pushed and moved by the force provided from the injection molding machine or other similar manufacturing machine, being further moved from the third moving position to a third end position via a third forward travel along the travel direction d. The pushing portion 60 and the second moving member 80 would stay without further moving when the third moving member 90 is moved forward. Accordingly, the third moving member 90 can be moved along the travel direction d in the third moving travel and the third forward travel. When the third moving member 90 is moved in the third moving travel, the second moving member 80 is moved simultaneously. After the third moving member 90 is moved to the dividing point of the third moving travel and the third forward travel, the second moving member 80 is no longer moved together with the third moving member 90.

Accordingly, the mold movement control mechanism of the present embodiment can be assembled in manufacturing machine, pushed and moved by the machine. In a full traveling of the third moving member, the travel lengths and the positions of the first moving member and the second moving member can be determined by controlling when and where the engaging member and the coupling member would become rotatable. The total travel length of the first moving member is determined according to the length of the travel path through where the engaging member is moved along the first front sub-groove. The total travel length of the second moving member is determined according to the length of the travel path through where the coupling member is moved along the second front sub-groove. Thus, positions and moving travels of the first, second, and third moving members are precisely controlling and determined.

Figure 8:
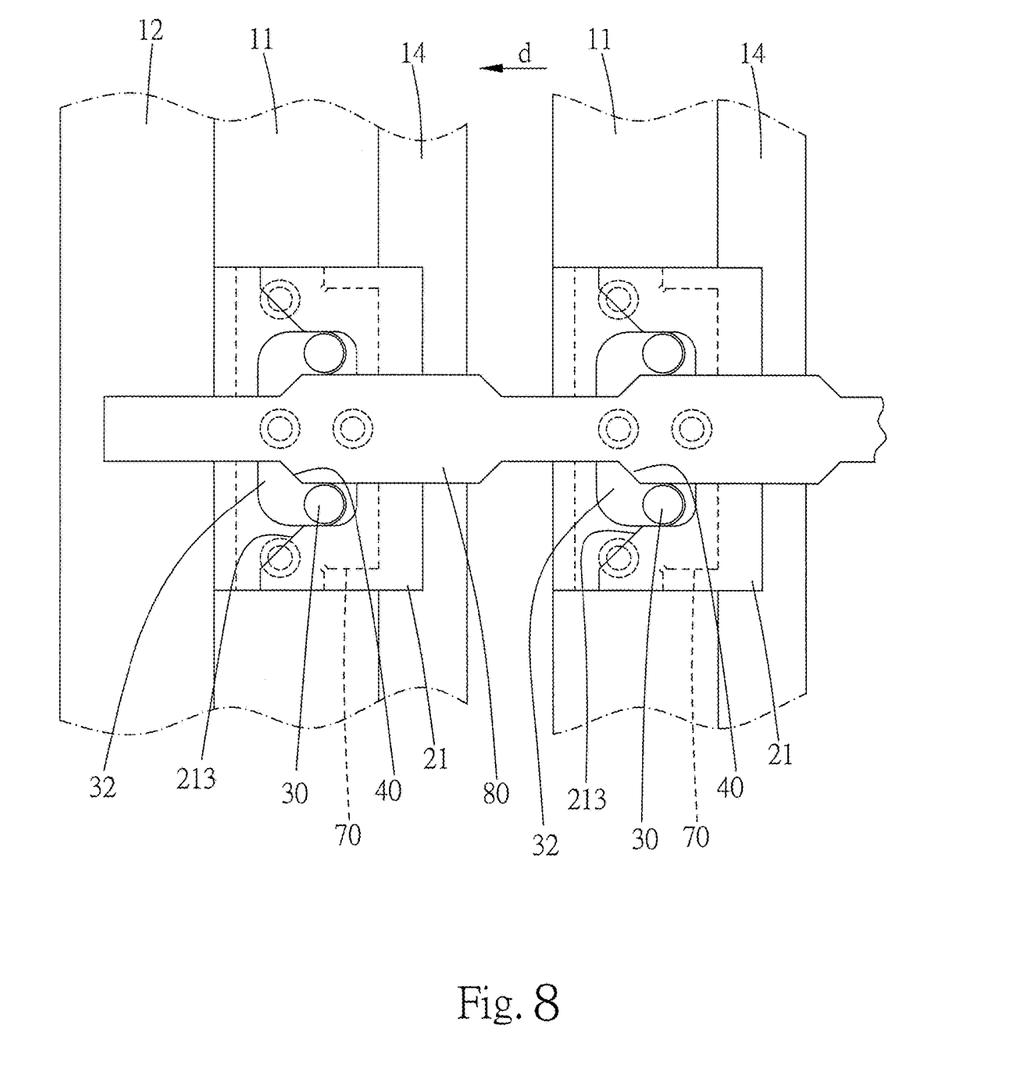
FIG. 8 is a cross sectional view showing a mold of another embodiment of the present invention.

In the previous embodiment, the first, second, and third moving members are combined with the first, second, and third plates respectively for bringing the plates to move. In other possible embodiments of the present invention, the mold module may include the first plate and the second plate only. The mold movement control mechanism may be provided only with the first fixation member, the first moving member, the engaging member, the abutting portion, and the second moving member. The manufacturing machine can push the second moving member or the second plate to move to operate the mold movement control mechanism. If the mold module includes more than three plates, based on the mold movement control mechanisms of the embodiments mentioned above, the first fixation member, the first moving member, the engaging member, and the abutting portion may be repeatedly disposed along the travel direction, as shown in FIG. 8. The repeatedly provided first moving members can be used in controlling the plates to move in a predetermined travel.

In the previous embodiment, two sets of the engaging members, the abutting portions, the coupling members, and the pushing portions are symmetrically provided and assembled in the mold movement control mechanism. The transmissions of force and movement are well-distributed. However, in other possible embodiments of the present invention, single set of the engaging member, the abutting portion, the coupling member, and the pushing portion could still work with suitable guiding surface or guiding groove which may be provided for maintaining the travel path on the travel direction.

In the previous embodiment, the engaging member is rotatably disposed on the first moving member, and the abutting portion is disposed on the second moving member. However, it is also possible to dispose the engaging member rotatably on the second moving member, and to dispose the abutting portion on the first moving member. Similarly, the coupling member could be disposed on the second moving member, and the pushing portion could be disposed on the third moving member.

To conclude, the mold movement control mechanism can be used to control the positions and moving travels of the plates of mold module. No spring is necessary. Difficulties and costs of design and maintenance of the mold are lowered.

What is claimed is:

1. A mold movement control mechanism comprising:
a base module;
an engaging member;
an abutting portion;
a coupling member;
a pushing portion;
a first moving member;
a second moving member; and
a third moving member;
the base module is configured to assemble the engaging member, the abutting portion, the coupling member, the pushing portion, the first moving member, the second moving member, and the third moving member;
the engaging member is configured to move relative to the base module along a travel direction from a first engaging position to a moved engaging position via an engaging member travel, the engaging member is configured to rotate about an engaging axis between an engagement position and a release position when the engaging member is located at the moved engaging position, the engaging member is configured to be restricted at the engagement position by the base module when the engaging member is at the first engaging position and during the engaging member travel;
the abutting portion is configured to move relative to the base module along the travel direction, the abutting portion and the engaging member are configured to engage with each other when the engaging member is at the engagement position in a manner that the abutting portion and the engaging member are moved simultaneously during the engaging member travel, the abutting portion and the engaging member are configured to disengage when the engaging member is located at the release position;
the first moving member is configured to move relative to the base module along the travel direction;
the second moving member is configured to move relative to the base module along the travel direction;
the third moving member is configured to move relative to the base module along the travel direction;
the coupling member and the pushing portion are configured to engage with each other; and
wherein the engaging member is rotatably disposed on one of the first moving member and the second moving member, the abutting portion is disposed on the other one of the first moving member and the second moving member, the coupling member is rotatably disposed on the third moving member, and the pushing portion is disposed on the second moving member.

2. The mold movement control mechanism of claim 1, wherein a torque is exerted on the engaging member, bringing the engaging member a rotational tendency from the engagement position to the release position when the engaging member and the abutting portion are engaged with each other.

3. The mold movement control mechanism of claim 1, wherein a contacting surface of the engaging member which is in contact with the abutting portion is tilted to the travel direction.

4. The mold movement control mechanism of claim 1, wherein the engaging member is rotatably disposed on the first moving member, the abutting portion is disposed on the second moving member, the second moving member is movable along the travel direction in paths of a second moving travel and a second forward travel, a length of the second moving travel is equal to that of the engaging member travel.

5. The mold movement control mechanism of claim 4, the coupling member is configured to move relative to the base module along the travel direction from a first coupling position to a moved coupling position via a coupling member travel, the coupling member is configured to rotate about a coupling axis between a closing position and an opening position when the coupling member is located at the moved coupling position, the coupling member is configured to be restricted at the closing position by the base module when the coupling member is at the first coupling position and during the coupling member travel, the coupling member and the pushing portion are configured to engage with each other when the coupling member is at the closing position in a manner that the coupling member and the pushing portion are moved simultaneously during the coupling member travel, the coupling member and the pushing portion are configured to disengage when the coupling member is located at the opening position; wherein the third moving member is configured to move along the travel direction in paths of a third moving travel and a third forward travel, a length of the third moving travel is equal to a total length of the second moving travel and the second forward travel.

6. The mold movement control mechanism of claim 5, wherein a torque is exerted on the coupling member, bringing the coupling member a rotational tendency from the closing position to the opening position when the coupling member and the pushing portion are engaged with each other.

7. The mold movement control mechanism of claim 5, wherein a contacting surface of the pushing portion which is in contact with the coupling member is tilted to the travel direction.

8. The mold movement control mechanism of claim 1, wherein the engaging member is rotatably disposed on the second moving member, the abutting portion is disposed on the first moving member, the second moving member is movable along the travel direction in paths of a second moving travel and a second forward travel, a length of the second moving travel is equal to that of the engaging member travel.

9. A mold, comprising the mold movement control mechanism of claim 1, further comprising a mold module, the mold module comprising a first plate and a second plate, the first moving member being disposed on the first plate, the second moving member being disposed on the second plate.

10. The mold of claim 9, wherein a torque is exerted on the engaging member, bringing the engaging member a rotational tendency from the engagement position to the release position when the engaging member and the abutting portion are engaged with each other.

11. The mold of claim 9, wherein a contacting surface of the engaging member which is in contact with the abutting portion is tilted to the travel direction.

12. The mold of claim 9, wherein the engaging member is rotatably disposed on the first moving member, the abutting portion is disposed on the second moving member, the second moving member is movable along the travel direction in paths of a second moving travel and a second forward travel, a length of the second moving travel is equal to that of the engaging member travel.

13. The mold of claim 9, wherein the engaging member is rotatably disposed on the second moving member, the abutting portion is disposed on the first moving member, the second moving member is movable along the travel direction in paths of a second moving travel and a second forward travel, a length of the second moving travel is equal to that of the engaging member travel.

14. A mold, comprising the mold movement control mechanism of claim 5, further comprising a mold module, the mold module comprising a first plate, a second plate, and a third plate, the first moving member being disposed on the first plate, the second moving member being disposed on the second plate, the third moving member being disposed on the third plate.

15. The mold of claim 14, wherein a torque is exerted on the coupling member, bringing the coupling member a rotational tendency from the closing position to the opening position when the coupling member and the pushing portion are engaged with each other.

16. The mold of claim 14, wherein a contacting surface of the pushing portion which is in contact with the coupling member is tilted to the travel direction.

* * * * *